(12) United States Patent
Stein

(10) Patent No.: US 10,048,393 B2
(45) Date of Patent: Aug. 14, 2018

(54) GAIN STABILIZATION OF PHOTOMULTIPLIERS

(71) Applicant: TARGET SYSTEMELEKTRONIK GMBH & CO. KG, Wuppertal (DE)

(72) Inventor: Jürgen Stein, Wuppertal (DE)

(73) Assignee: TARGET SYSTEMELEKTRONIK GMBH & CO. KG, Wuppertal (DE)

( * ) Notice: Subject to any disclaimer, the term of this patent is extended or adjusted under 35 U.S.C. 154(b) by 0 days.

(21) Appl. No.: 15/348,354

(22) Filed: Nov. 10, 2016

(65) Prior Publication Data
US 2017/0059722 A1 Mar. 2, 2017

Related U.S. Application Data

(63) Continuation of application No. PCT/EP2015/060390, filed on May 11, 2015.

(30) Foreign Application Priority Data

May 11, 2014 (DE) .................................. 14 167 814

(51) Int. Cl.
*G01T 1/20* (2006.01)
*G01T 1/40* (2006.01)
*G01T 1/202* (2006.01)

(52) U.S. Cl.
CPC .............. *G01T 1/40* (2013.01); *G01T 1/202* (2013.01); *G01T 1/2018* (2013.01)

(58) Field of Classification Search
CPC G01T 1/202; G01T 1/208; G01T 1/40; G01T 1/20; G01T 1/2006; G01T 1/2018; G01T 1/203

USPC .................................................... 250/361 R
See application file for complete search history.

(56) References Cited

U.S. PATENT DOCUMENTS

| 5,079,424 A * | 1/1992 | Kobayashi | G01T 1/40 250/363.09 |
| 5,218,202 A | 6/1993 | Evers | |
| 2011/0031405 A1* | 2/2011 | Kulik | G01T 1/40 250/362 |

(Continued)

FOREIGN PATENT DOCUMENTS

WO    90/02415 A1    3/1990

OTHER PUBLICATIONS

International Search Report for corresponding International Application No. PCT/EP2015/060390 dated Aug. 31, 2015.

*Primary Examiner* — Taeho Jo
(74) *Attorney, Agent, or Firm* — Myers Wolin, LLC

(57) ABSTRACT

A self-stabilizing scintillation detector system for the measurement of nuclear radiation, preferably gamma radiation, is provided, the system comprising a scintillation crystal, a photo detector, a photomultiplier (PMT) with n dynodes and an evaluation system connected to the output port of the PMT, i.e. the anode of the PMT, the PMT comprising at least two connections to at least two different dynodes of the PMT, a device for measuring the electric current at the at least two dynodes, as well as an electronic device for determining the quotient of the measured at least two electric currents at the at least two dynodes, said quotient being a measure for the gain between the two dynodes, further comprising means for comparing the measured quotient with a reference value, and means for adjusting the gain of the PMT by utilizing the gain change over time.

8 Claims, 2 Drawing Sheets

(56) References Cited

U.S. PATENT DOCUMENTS

| | | | |
|---|---|---|---|
| 2011/0182407 A1* | 7/2011 | Morton | G01T 1/167 378/62 |
| 2011/0186740 A1* | 8/2011 | Normand | H01J 43/04 250/362 |
| 2012/0314827 A1* | 12/2012 | Dioszegi | G01N 23/222 376/156 |
| 2014/0151529 A1* | 6/2014 | Steiner | H01J 43/20 250/207 |
| 2014/0151549 A1* | 6/2014 | Steiner | H01J 43/30 250/288 |
| 2015/0162174 A1* | 6/2015 | Badiei | H01J 49/0009 250/288 |
| 2016/0223494 A1* | 8/2016 | Steiner | H01J 43/30 |
| 2016/0372309 A1* | 12/2016 | Steiner | H01J 43/20 |

\* cited by examiner

GAIN STABILIZATION OF PHOTOMULTIPLIERS

CROSS REFERENCE TO RELATED APPLICATIONS

This application is a continuation of International Application No. PCT/EP2015/060390, filed on May 11, 2015, which claims priority to European Application No. 14167814.4, filed May 11, 2014, the contents of each of which are incorporated by reference herein.

TECHNICAL FIELD

The invention relates to a self-stabilizing scintillation detector system for the measurement of nuclear radiation, preferably gamma radiation, comprising a scintillation crystal, a photo detector, a photomultiplier tube (PMT) within dynodes and an evaluation system connected to the output port of the PMT, i.e. the anode of the PMT.

BACKGROUND

Such systems are principally known in the art. It is especially known that the gain µ of a scintillation detector system, comprising a scintillator, a photocathode and a photomultiplier tube (PMT) together with an evaluation system is subject to a change in gain over time. The gain change of the overall system is substantially effected by the gain change of the PMT. That gain change is due to environmental changes, i.e. a modification in temperature over time or other environmental factors.

In order to stabilize the gain of the PMT, it is known in the art to conduct several measurements over time and to compare the results. An initial or reference measurement may take place at beginning of the first measurement of nuclear radiation, for example using a calibration source with well-known energies of the emitted gamma radiation. The light signals, produced by the gamma radiation in the scintillator crystal, are proportional to the energy deposed in that crystal. The light signals do then hit the photocathode, that photocathode emitting electrons, which are collected by a PMT. A PMT consists of a series of dynodes and a final anode. The usually very few photoelectrons from the photocathode are accelerated towards the first dynode where they produce a multitude of electrons, being emitted from that first dynode. Those electrons are then accelerated to the next dynode, where their number is again multiplied by the same factor, those electrons being led to the next dynode and so on, until they finally reach the anode of the PMT, where a current signal is measured, being proportional to the charge of the multitude of electrons. That charge is proportional to the amount of light, generated in the scintillator and therefore proportional to the energy deposed by the gamma radiation in the scintillator.

The resulting charge signal is then further processed and usually stored in a multichannel analyzer (MCA), each channel of that MCA corresponding to a specific radiation energy, deposed in the scintillator crystal. An accumulation of such energy signals results in an energy spectrum, each line in that spectrum corresponding to a specific energy deposed in the detector system.

For most applications it is of interest to obtain the best resolution in energy a system allows. One of the problems, leading to a decrease in energy resolution is the gain shift, which is to be avoided therefore.

In order to do so, it is known to measure the gain at different times, using gamma radiation with known energy. This gamma radiation with known energy may be emitted by a calibration source, or may be another known energy, being present in the spectrum to be measured anyway. The gain of the two measurements at different times is compared and the signals are corrected by the difference, therefore multiplying all signals by a so-called gain correction factor, thereby stabilizing the overall system.

It is also known to use artificial light pulses instead of light pulses, generated by the scintillation crystal following the absorption of radiation energy. Such an artificial light source may be an LED.

The disadvantage of all these known systems is that one has to know either a specific—constant—line (energy) in the spectrum to be measured or to use a calibration source, thereby interrupting the measurement from time to time. In addition, especially at high count rates, it may be difficult to obtain a stabilization spectrum at all.

The aim of the present invention is therefore to avoid the above-mentioned disadvantages and to provide a self-stabilizing scintillation detector system without the need of identifying specific lines in the output spectrum, identified as calibration sources, and to correct the gain on the basis of the shift of those lines.

SUMMARY

Disclosed is a self-stabilizing scintillation detector system for the measurement of nuclear radiation, preferably gamma radiation, does comprise a scintillation crystal, a photo detector, a photomultiplier (PMT) with n dynodes and an evaluation system connected to the output port of the PMT, i.e. the anode of the PMT. The PMT does comprise at least two connections to at least two different dynodes m1 and m2 of the PMT, a device for measuring the electric current $I_{dym1}$ and $I_{dym2}$ at the at least two dynodes m1 and m2, as well as an electronic device for determining the quotient δ of the measured at least two electric currents $I_{dym1}$ and $I_{dym2}$ at the at least two dynodes, said quotient δ being a measure for the gain between the two dynodes, the detector system further comprising means for comparing the measured quotient δ with a reference value $δ_{REF}$, and means for adjusting the gain of the PMT by utilizing the gain change over time.

It has proven an advantage to use dynodes 5 and 7 or 6 and 7. The results may be further improved if the system is set up in a way that only those electric currents $I_{dym1}$ and $I_{dym2}$ at the at least two dynodes m1 and m2 are utilized, when their measured current I is above a predefined threshold, where the threshold is preferably set to allow only electric currents $I_{dym1}$ and $I_{dym2}$ to pass, being equivalent to a measured gamma-event with a deposited gamma energy of at least 10 MeV, preferably between 10 MeV and 100 MeV. As one could make use of scintillator events, triggered by gamma ray absorption also, the threshold may also be set at lower gamma energies, for example at energies of 700 keV, 1 MeV, 1.5 MeV, 2 MeV or 2.7 MeV.

The detector system preferably does comprise two multichannel analyzers (MCA) in combination with two preamplifiers, measuring the charge at the two dynodes m1 and m2. It is even more advantageous when the detector system does comprise an automatic gain control, being set to correct the total gain µ(t) of the PMT on the basis the gain shift ε(t) and the reference gain $µ_{REF}(t)$ by multiplying the total gain µ(t) with the reciprocal $ε(t)^{-n}$, so that $µ_{REF}(t)=µ(t)*ε(t)^{-n}$, ε(t) being defined as ε(t)=$(I_{dym1}/I_{dym2})^{1/(m1-m2)}/\delta_{REF}(t)$, $\delta_{REF}(t)$ being the reference gain between the two dynodes m1 and m2.

Disclosed is also a method for stabilizing the gain of a PMT in a scintillation detector system for the measurement of nuclear radiation, preferably gamma radiation, according to one of the preceding apparatus claims, said method comprising the following steps: evaluating the output current at a first dynode $I_{dym1}$, evaluating the output current at a second dynode $I_{dym2}$, whereas the number of the second dynode m2 is m2=m1−k, k being the difference between m1 and m2, calculating the quotient $\delta=(I_{dym1}/I_{dym2})^{1/(m1-m2)}=(I_{dym1}/I_{dym2})^{1/k}$, said quotient δ being a measure for the gain between the two dynodes, determining the gain shift ε(t) by calculating the quotient of δ and a previous reference quotient $\delta_{REF}$, ε(t)=δ(t)/$\delta_{REF}$(t), adjusting the total gain μ(t) of the PMT on the basis of said gain shift ε(t) and the reference gain $\mu_{REF}(t)$ by multiplying the total gain μ(t) with the reciprocal ε(t)$^{-n}$, so that $\mu_{REF}(t)=\mu(t)*\varepsilon(t)^{-n}$, evaluating the output signals at the anode of the PMT by determining the number of events as a function of the measured charge, said charge being a function of the energy, the nuclear particle has deposited in the scintillator.

BRIEF DESCRIPTION OF THE DRAWINGS

A specific example will be described in the following, referring to.

DETAILED DESCRIPTION

Figure 1:
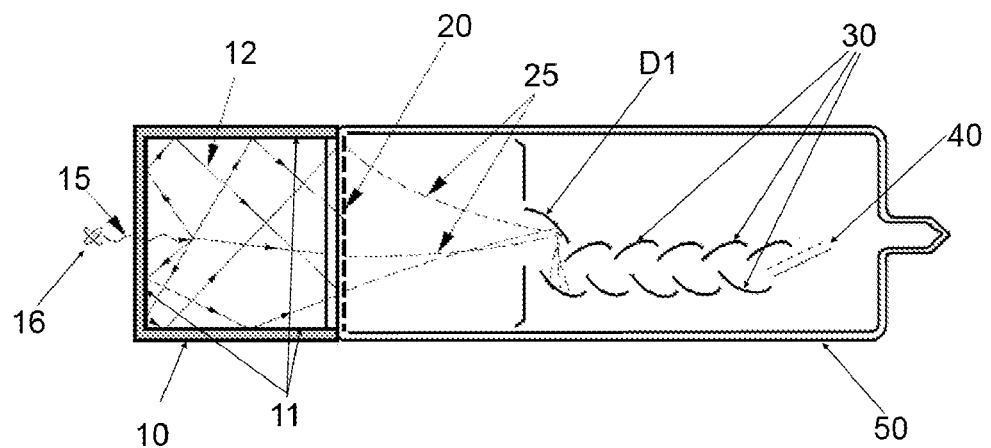
FIG. 1, showing a known detector setup in general.

FIG. 1 does show a scintillator crystal 10 with a reflective coating 11, reflecting the light 12, emitted from the scintillator when a gamma ray 15 from a radiation source 16 interacts with the scintillation crystal. At one side of the scintillation crystal, a photocathode 20 is located. There is no reflective coating around the scintillator crystal at the side of the photocathode.

When the light 12 hits the photocathode 20, photoelectrons 25 are emitted and directed to a dynode chain 30 within a photomultiplier tube (PMT) 50, hitting the first dynode D1. The number of electrons hitting the first dynode D1 is then multiplied by a factor G from the first dynode, then hitting the second third and so on dynodes before leading to the anode 40. From the anode 40, the current signal is directed to a preamplifier, a voltage amplifier and a discriminator, then further processed by an analog to digital converter (ADC) whereas the resulting digital signal is stored in a memory, i.e. a memory of a multichannel analyzer (not shown). That spectrum may be further evaluated with a computer.

Figure 2:
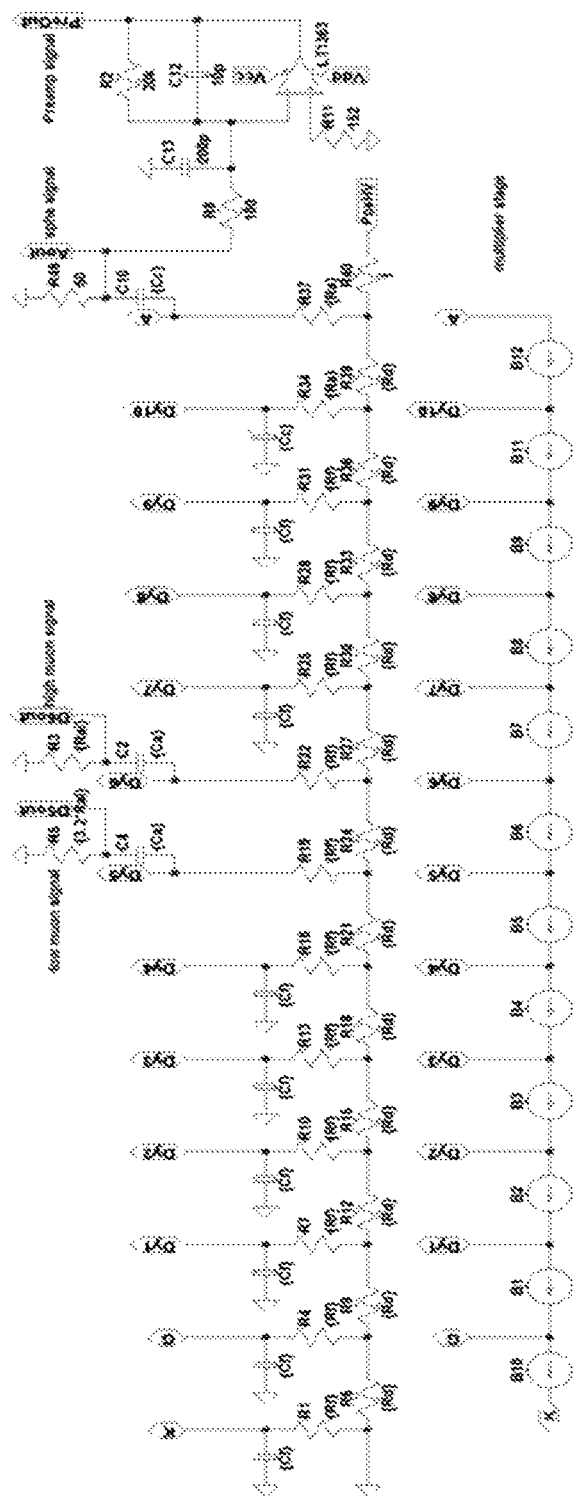
FIG. 2, showing a PMT and HV divider circuit diagram.

FIG. 2 shows an exemplary circuit diagram of a PMT which may be used with the invention. In this example, dynodes number 5, named 'low muon signal', and 6, named 'high muon signal', are connected to a separate evaluation system also (not shown). As it is known from the prior art already, it is possible to make use of the signal arriving at dynodes in the dynode chain also. It has to be noted that the anode, i.e. the usual output of the PMT, does measure the current, i.e. the number of electrons, arriving at the anode. From a physical point of view, the current measured at the dynodes does refer to the "missing current", produced by the additional electrons, leaving the dynode, due to the amplification of the signal.

Apart from that, the signal which can be measured at the dynodes is, like the signal at the anode, proportional to the energy deposed in the scintillator, which is proportional to the amount of light produced in the scintillator by a radiation event, that amount of light being proportional to the number of electrons emitted by the photocathode when the light is hitting that photocathode.

The invention makes use of the fact that the amplification factor g between any of two neighboring dynodes is constant. In addition, it is assumed that the environmental effects on the gain, especially the shifting temperature, are the same for all dynodes. This is a very good assumption as, compared to environmental influences, the PMT is a very small device.

As the gain between two dynodes is the same and as the environmental effects on the various dynodes are more less the same also, the gain shift between two neighboring dynodes or between any of two dynodes is constant and direct proportional to the gain shift of the PMT as a whole, measured at the anode. More specifically, the gain δ between two dynodes is the quotient of the measured current at the two dynodes times the reciprocal of the difference between the two order numbers of the dynodes used. When using dynodes 5 and 6 as shown in FIG. 2, the measured gain between the two dynodes is δ equals $(I_{DY5}/I_{DY6})^{1/(6-5)}$.

The gain shift ε(t) over time is then simply the quotient of the measured gain and a reference value, ε(t)=δ(t)/$\delta_{REF}$(t), so that the total gain μ(t) of the PMT can be calculated on the basis of the gain shift ε(t) by using the formula $\mu_{REF}(t)=\mu(t)*\varepsilon(t)^{-n}$, n being the number of dynodes used in the PMT.

As a result, fractions of the anode signal current in a PMT can be read out with any dynode. A charge or current signal could thus be collected at two different dynodes of the PMT at different amplification levels. Since the gain multiplier between two stages is typically only a factor of 4, many arbitrary pulses could be picked up and analyzed equivalently at two consecutive stages.

As the gain multiplication factor at any dynode various with changing conditions in the same way as all other dynodes in the same assembly, it is sufficient to keep track of the gain multiplier of two arbitrary stages over time in order to correct for the total PMT gain fluctuation. The real time dynode gain multiplier is given as a quotient of two synchronous current measurements at consecutive dynodes. The gain at the specific dynodes stage can thus be determined directly from the measurement with high accuracy.

The problem is usually that the signal available at the dynodes are very small compared to the output signal at the anode for all signals in the gamma spectrum to be measured. As a comparison of two very small signals will lead to a significant error, this is not a suitable way to handle the measurement.

Nevertheless, the inventor has found that there are radiation particle candidates for generating strong signals in a scintillator detector available. Those particles could be cosmic muons. In a standard NaI(Tl) a scintillation crystal of two times to inch, a count rate of 0.5 counts per second (cps) can be expected anywhere on earth. Those cosmic muons provide high signals of 10 MeV to 100 MeV gamma equivalent energy at a reasonably low count rate. As those pulses are ten or more times higher than the highest gamma signals of interest, they can easily be gathered simultaneously at lower gain stages, i.e. in parallel to a running measurement of gamma radiation. Dynodes, which are five stages below the anode, do still deliver a sufficient signal height.

For practical purposes, the gain of the PMT is measured using any arbitrary muon pulse picked up at dynodes 5 and 6 like in FIG. 2. The quotient of two integrated charge values of the same arbitrary pulse is then used to determine the total gain for all other signals at the data collection output.

It has to be noted that the inventive detector does not need muons for stabilization, as the described effect is totally independent from the kind of energy absorbed by the scintillator, the light of which is measured with the photo cathode—PMT setup as described. In many cases, it might be an advantage to make use of muons, but it is also possible to use any other event, especially any event triggered by gamma radiation which is to be measured anyway, as long as its energy is high enough to produce an output signal at the two dynodes used. Experiments showed that gamma energies around 1 MeV are sufficient already. The gamma spectrum to be measured does often include gamma rays with energies up to 2.6 MeV or even 3 MeV, which is definitely sufficient. Depending on the energies mostly used for stabilization, it is also possible to use dynodes closer to the anode, where the amplification level is higher. This does easily assure that events with lower energies do provide a sufficiently strong signal allowing for an evaluation.

It is important to mention that the energy of the events to be used has, unlike the stabilization systems known in the art, not to be known as long as it is assured that the output signals at the two dynodes belong to the same signal. This is a further substantial advantage of this invention.

The advantages of the muon pulse usage are for one its universal presence and secondly the fact that it is not affected by a count rate.

As a consequence, the new type of detector as well as the method for stabilizing the gain of that detector by using muon induced signals or other suitable signals which are available as described above, evaluating the gain shift between two arbitrary selected dynodes, does establish a new class of self-stabilizing radiation detectors. As the stabilization can be provided continuously, no separate measurements and no calibration sources are necessary anymore. It is not even necessary to know the energy of the event used for stabilization. This allows the construction of a very robust detector, which can be used easily outside of a scientific laboratory. Such a detector system, using the claimed stabilization method is therefore especially an important improvement for detectors to be used in rough environments, like for homeland security applications.

What is claimed is:

1. A self-stabilizing scintillation detector system for the measurement of nuclear radiation, preferably gamma radiation, comprising:
    a scintillation crystal,
    a photo detector,
    a photomultiplier (PMT) with n dynodes and an evaluation system connected to the output port of the PMT, the PMT comprising at least two connections to at least two different dynodes m1 and m2 of the PMT,
    a device for measuring the electric current $I_{dym1}$ and $I_{dym2}$ at the at least two dynodes m1 and m2, as well as
    an electronic device for determining the quotient $\delta=(I_{dym1}/I_{dym2})^{1/(m1-m2)}$ of the measured at least two electric currents $I_{dym1}$ and $I_{dym2}$ at the at least two dynodes, said quotient $\delta$ being a measure for the gain between the two dynodes, further comprising means for comparing the measured quotient $\delta$ with a reference value $\delta_{REF}$, and
    means for adjusting the gain of the PMT by utilizing a gain shift $\varepsilon=\delta/\delta_{REF}$ over time.

2. The detector system of claim 1, wherein the two dynodes used are a low muon signal dynode and a dynode adjacent a high muon signal dynode.

3. The detector system of claim 1, wherein the two dynodes used are a low muon signal dynode and a high muon signal dynode.

4. The detector system of claim 1 utilizing only those electric currents $I_{dym1}$ and $I_{dym2}$ at the at least two dynodes m1 and m2 when a measured current I is above a predefined threshold.

5. The detector system of claim 4 wherein the threshold is set to allow only electric currents $I_{dym1}$ and $I_{dym2}$ to pass, being equivalent to a measured gamma-event with a deposited gamma energy of at least 10 MeV.

6. The detector system of claim 1, further comprising two multi-channel analyzers (MCA) in combination with two pre-amplifiers, measuring a charge at the two dynodes m1 and m2.

7. The detector system of claim 1, further comprising an automatic gain control, being set to correct a total gain $\mu(t)$ of the PMT on the basis the gain shift $\varepsilon(t)$ and a reference gain $\mu_{REF}(t)$ by multiplying the total gain $\mu(t)$ with the reciprocal $\varepsilon(t)^{-n}$, so that $\mu_{REF}(t)=\mu(t)*\varepsilon(t)^{-n}$, $\varepsilon(t)$ being defined as $\varepsilon(t)=(I_{dym1}/I_{dym2})^{1/(m1-m2)}/\delta_{REF}(t)$, $\delta_{REF}(t)$ being the reference gain between the two dynodes m1 and m2.

8. A method for stabilizing the gain of a PMT in a scintillation detector system for the measurement of nuclear radiation, according to claim 1, the method comprising:
    evaluating the output current at a first dynode $I_{dym1}$,
    evaluating the output current at a second dynode $I_{dym2}$, whereas the number of the second dynode m2 is m2=m1−k, k being the difference between m1 and m2,
    calculating the quotient $\delta=(I_{dym1}/I_{dym2})^{1/(m1-m2)}=(I_{dym1}/I_{dym2})^{1/k}$, said quotient $\delta$ being a measure for the gain between the two dynodes,
    determining the gain shift $\varepsilon(t)$ by calculating the quotient of $\delta$ and a previous reference quotient $\delta_{REF}$, $\varepsilon(t)=\delta(t)/\delta_{REF}(t)$,
    adjusting a total gain $\mu(t)$ of the PMT on the basis of said gain shift $\varepsilon(t)$ and the reference gain $\mu_{REF}(t)$ by multiplying the total gain $\mu(t)$ with the reciprocal $\varepsilon(t)^{-n}$, so that $\mu_{REF}(t)=\mu(t)*\varepsilon(t)^{-n}$,
    evaluating the output signals at the anode of the PMT by determining the number of events as a function of the measured charge, said charge being a function of the energy, the nuclear particle has deposited in the scintillator.

* * * * *